United States Patent Office 3,657,186
Patented Apr. 18, 1972

3,657,186
POLYIMINOBENZOXAZINEDIONES AND
METHOD OF PREPARATION
James M. Craven, Wilmington, Del., assignor to E. I. du
Pont de Nemours and Company, Wilmington, Del.
No Drawing. Filed Aug. 26, 1970, Ser. No. 67,230
Int. Cl. C08g 22/06, 22/26, 33/02
U.S. Cl. 260—47 CB       5 Claims

ABSTRACT OF THE DISCLOSURE

A novel polyiminobenzoxazinedione composition which is the reaction product of a multifunctional isocyanate and a multifunctional aromatic o-hydroxynitrile.

BACKGROUND OF THE INVENTION

There are a number of compositions known to the art which are useful as adhesives or laminates. However, many of these compositions are not thermally stable at high temperatures. Other compositions tend to produce volatile by-products during a high temperature thermal cure. These volatile by-products tend to cause gas bubbles thereby weakening any structure of which they are a part.

SUMMARY OF THE INVENTION

This invention relates to a novel polyiminobenzoxazinedione composition formed by thermally reacting a multifunctional isocyanate and a multifunctional aromatic o-hydroxynitrile. Substantially no volatile by-products are given off during the thermal reaction to a polyiminobenzoxazinedione which would weaken the composition. A basic solvent is also not essential to the reaction as the multi-functional diisocyanate and multi-functional aromatic o-hydroxynitrile may be mixed together and reacted unless both are in a solid state.

DESCRIPTION OF THE INVENTION

The polyiminobenzoxazinedione of this invention is formed by thermally reacting a multifunctional isocyanate and a multifunctional aromatic o-hydroxynitrile.

Multifunctional aromatic o-hydroxynitriles which are suitable for use in this invention have the general structure (HO)$_n$—R—(CN)$_n$ where each —CN is ortho or peri to an OH group where R can be

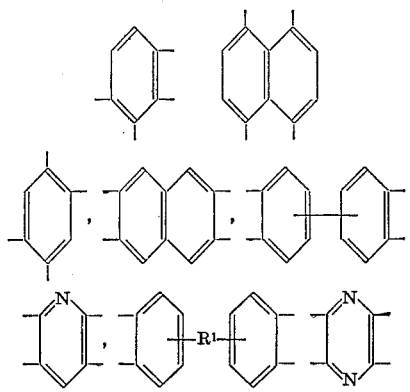

wherein R$^1$ can be an alkylene radical containing 1-4 carbon atoms,

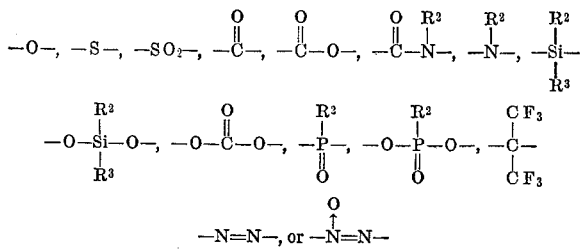

where R$^2$ and R$^3$ are individually selected from the group consisting of an alkyl radical having 1-3 carbon atoms and an aryl radical, and
where $n$ is any integer greater than 1.

Other functional groups may be attached to R so long as their reaction speed with an isocyanate group is less than that of the o-hydroxynitrile groups.

Preferred multifunctional aromatic o-hydroxynitriles are difunctional o-hydroxynitriles, especially

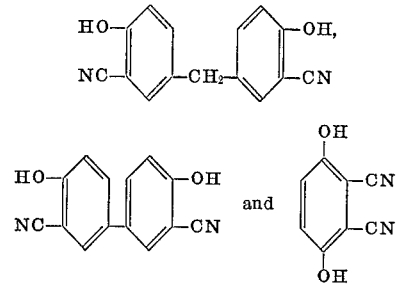

Multifunctional isocyanates suitable for use in the invention are any aromatic, aliphatic, alicyclic or heterocyclic isocyanates. The isocyanate selected must have at least 2 isocyanate functionalities.

The isocyanate should have the general structure

R$^4$—(NCO)$_n$ where $n$ is an integer greater than 1, and
where R$^4$ can be an alkylene radical having 2-40 carbon atoms,

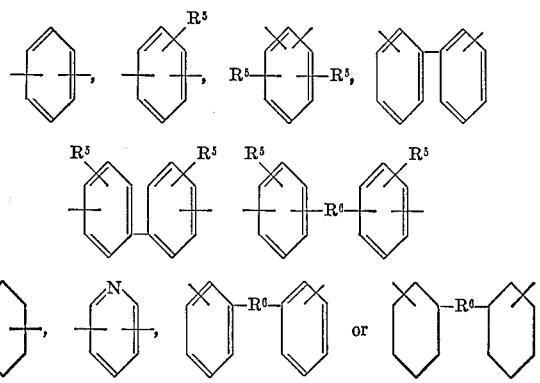

wherein R$^6$ is either an alkylene radical containing 1-4 carbon atoms,

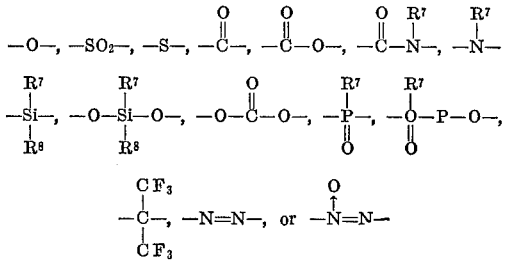

and $R^5$ is an alkyl radical of 1–3 carbon atoms and $R^7$ and $R^8$ are individually selected from the group consisting of an alkyl radical having 1–3 carbon atoms and an aryl radical.

The following are organic diisocyanates useful in this invention:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate,
bis-(para-amino-cyclohexyl)ether,
bis-(para-amino-cyclohexyl)diethyl silane,
bis-(para-amino-cyclohexyl)diphenyl silane,
bis-(para-amino-cyclohexyl)ethyl phosphine oxide,
bis-(para-amino-cyclohexyl)phenyl phosphine oxide,
2,11-diisocyano-dodecane, and the like, meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate, dialkyl benzene diisocyanates, such as methylpropylbenzene diisocyanate, methylethylbenzene diisocyanate, and the like;

2,2'-biphenylene diisocyanate,
3,3'-biphenylene diisocyanate,
4,4'-biphenylene diisocyanate,
3,3'-dimethyl-4,4'-biphenylene diisocyanate, and the like;

methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisopropylidene-bis-(4-phenyl isocyanate), and the like;

2,2'-oxydiphenyl diisocyanate,
3,3'-oxydiphenyl diisocyanate,
4,4'-oxydiphenyl diisocyanate, and the like;

2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;

2,2'-sulfonediphenyl diisocyanate,
3,3'-sulfonediphenyl diisocyanate,
4,4'-sulfonediphenyl diisocyanate, and the like;

2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)-N-phenyl amine,
bis-(para-isocyano-cyclohexyl)-N-methyl amine, 2,6-diisocyano-pyridine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-(β-isocyano-t-butyl)toluene,
bis-(para-β-isocyano-t-butyl-phenyl)ether,
para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH_2)_3S(CH_2)_3NCO$, and
$OCN(CH_2)_3N(CH_2)_3NCO$.

Preferred isocyanates are toluene-2,4-diisocyanate and 4,4'-methylenebis(phenylisocyanate).

The reaction of the multifunctional isocyanate and the multifunctional aromatic o-hydroxynitrile is a thermal cure of 130° to 300° C. for about 1 to 24 hours.

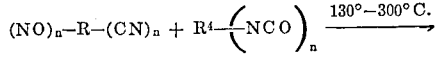

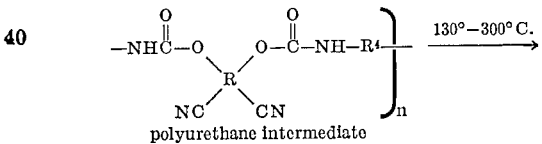

polyurethane intermediate

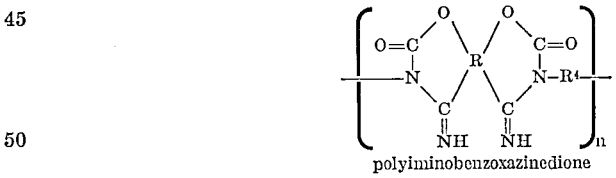

polyiminobenzoxazinedione where $n$ is an integer sufficient to give the polymer a molecular weight (number average) of greater than 2000 where R can be

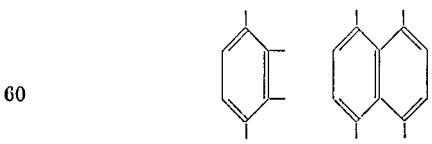

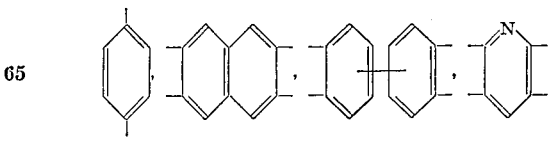

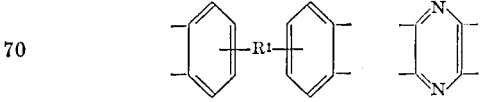

wherein $R^1$ can be an alkylene radical containing 1–4 carbon atoms,

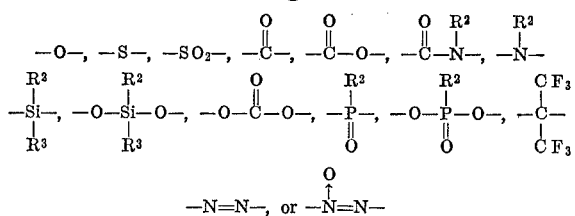

where $R^2$ and $R^3$ are individually selected from the group consisting of an alkyl radical having 1–3 carbon atoms and an aryl radical, and where $R^4$ can be an alkylene radical having 2–40 carbon atoms,

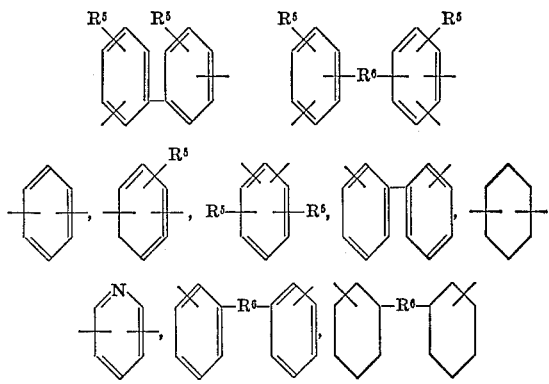

and

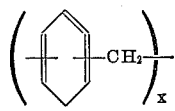

where $x$ is 1–100 wherein $R^6$ is either an alkylene radical containing 1–4 carbon atoms,

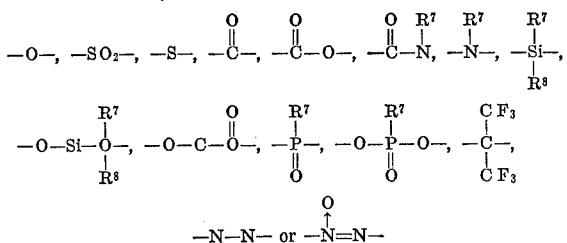

and $R^5$ is an alkyl radical of 1–3 carbon atoms and $R^7$ and $R^8$ are individually selected from the group consisting of an alkyl radical having 1–3 carbon atoms and an aryl radical.

If the value of $n$ is 2 for the multifunctional isocyanate and multifunctional o-hydroxynitrile, then preferably equimolar amounts of the isocyanate and o-hydroxynitrile should be used although up to a 10% excess by molar weight of either reactant can be tolerated in some cases without detracting too much from the properties of the polyiminobenzoxazinedione. When $n$ is greater than 2 for either of the reactants, then exact stoichiometry is not as critical and a 20–30% excess of either reagent can often be tolerated. However, for best properties of the polyiminobenzoxazinedione it is usually best to use sufficient o-aminonitrile and isocyanate so that there are equivalent amounts of —NCO and —OH. For example, if $n=3$ for the multifunctional isocyanate and $n=2$ for the multifunctional o-hydroxynitrile, then the molar ratio of multifunctional isocyanate to multifunctional o-hydroxynitrile should be about 2:3.

If the reactants are liquids, they can simply be mixed in the correct ratio, poured into a mold or other container and then heated to produce a polyiminobenzoxazinedione object. If one is a liquid and the other a solid, it is often possible to produce a solution of one in the other and treat as before. If the solid is insoluble in the liquid, it can often be milled or ground into the liquid to make a dispersion or paste, which can then be heated to prepare the polyiminobenzoxazinedione. If both reactants are solids, they can be ground together to give a finely powdered mixture and then compression molded at a temperature high enough to melt the mixture and convert it Another technique that is often convenient when one or both of the reactants are solids is to use a solvent. The multifunctional isocyanate and multifunctional o-hydroxynitrile are dissolved in a solvent and the solutions mixed. The resulting solution can then be applied to glass fabric, graphite fabric, polyamide fabric or any surface and the solvent evaporated. Any tendency for either the isocyanate or the o-hydroxynitrile to be deposited as a crystalline solid (which sometimes happens if one component has a high melting point) can be avoided by first heating the solution for a few minutes at the boiling point to get partial conversion to the polyurethane, which effectively inhibits any crystallization of the reactants. However, it is often undesirable to heat the solution too long or too high a temperature since too much conversion to polyurethane or premature conversion to polyiminobenzoxazinedione can make the composition infusible. One useful embodiment of the invention is a fusible mixture of reactants that can be melted to allow molding, laminating or adhesive bonding and then further heated to convert it to a higher melting or infusible polyiminobenzoxazinedione without producing any volatile by-products that would cause voids or bubbles. It is therefore desirable to remove solvent before converting the mixture to an infusible condition. Any solvent capable of dissolving the o-hydroxynitrile and isocyanate is useful so long as the solvent does not react with the isocyanate or the o-hydroxynitrile and so long as it can be evaporated at a temperature low enough to avoid conversion of the mixture to an infusible state. Typical solvents are toluene, xylene, methyl ethyl ketone, acetone, tetrahydrofuran, ethylene glycol dimethyl ether, chloroform and the like.

After the solvent has been evaporated either at room temperature or in an oven at up to about 130° C., the composition can then be molded, laminated or used to make adhesive bonds at 100–300° C., usually about 150–200° C.

Copolymers can be made by reacting a mixture of multifunctional isocyanates with a mixture of multifunctional o-hydroxynitriles. Copolymers can also be made by incorporating a third multifunctional compound reactive with either the isocyanate or the o-hydroxynitriles. Examples are diamine, diole, dithiole, isothiocyanates, etc.

Additives such as antioxidants, pigments, dyes, other polymers or resins, can also be added to achieve desired appearance or physical properties according to methods well known in the polymer art.

UTILITY

The polyiminobenzoxazinediones of this invention have particular utility as high temperature adhesives, structural laminates, and circuit boards.

DESCRIPTION OF THE PREFERRED EMBODIMENTS

The following examples illustrate the various aspects of the invention in greater detail. However, it should be recognized that they are only illustrative. Variations from what is disclosed will undoubtedly occur to those skilled in the art, but will nevertheless be embraced by the inventive concept. All parts are by weight.

EXAMPLE 1

Salicylaldehyde (276 ml.) was dissolved in 200 ml. acetic acid containing 28.0 g. trioxane. The resulting solution was stirred and heated at 95° C. and treated dropwise during a 1 hour period with a solution of 2.0 ml. sulfuric acid in 10 ml. acetic acid. Heating was continued for 7 hours. Then the solution was poured into 4000 ml. water to precipitate a gum, which was washed with 4000 ml. water. After the gum was washed with four 320 ml. portions of ether, it was converted into a nearly white solid, 5,5' - methylenebis(salicylaldehyde), which after washing with water and drying in air weighed about 95 g. and melted at about 137–140° C.

A mixture of 51.2 g. of the 5,5'-methylenebis(salicylaldehyde), 32.0 g. hydroxylamine hydrochloride, 50.0 g. sodium formate and 600 ml. formic acid was heated to reflux and held at reflux for one hour. The resulting solution was poured into 4000 ml. rapidly stirred water to precipitate white crystalline 5,5'-methylenebis(salicylonitrile), which after washing with water and drying in air weighed about 42.6 g. and melted at about 238–239° C. The compound can be purified by recrystallization. A 40 g. portion was dissolved in 160 ml. methanol. Then 500 ml. toluene and 1 teaspoon "Darco" decolorizing charcoal was added and the mixture stirred 10 minutes and then filtered to remove the "Darco." The solution was then stirred rapidly with a mechanical stirrer in a rapid stream of nitrogen to evaporate the chloroform and crystallize the 5,5'-methylenebis(salicylonitrile), which was then collected on a filter and dried in air. After two recrystallizations from chloroform and toluene, and a final recrystallization from an acetone and water mixture and a final vacuum-drying, the purified 5,5'-methylenebis(salicylonitrile) weighed about 19.4 g. and melted at about 250–251° C.

A solution of 1.000 g. 5,5'-methylenebis(salicyclonitrile) and 1.000 g. redistilled methylenebis(4-phenylisocyanate) in 10 ml. tetrahydrofuran was allowed to stand overnight. The solution was then poured on glass plates and heated in an oven 30 minutes at 50° C., 3 minutes at 50–65° C., 30 minutes at 50–65° C., 12 minutes at 65–125° C., 30 minutes at 125° C. When the glass slides were pressed together for 60 minutes at 177° C. and 100 p.s.i., they became bonded together with an essentially void-free layer of polymer which was partly converted to the polyiminobenzoxazinedione.

EXAMPLE 2

A solution of 0.87 g. toluene-2,4-diisocyanate in 3 ml. tetrahydrofuran was mixed with a solution of 0.80 g. 2,3-dicyanohydroquinone in 3 ml. tetrahydrofuran and then stirred with 0.83 g. crystalline silica having a particle size less than 110 microns. The resulting mixture was then poured on two glass plates. A piece of glass fabric is pressed into the solution on one of the plates, then they were dried 30 minutes at 50° C. and 30 minutes at 120° C. The plates were then pressed together for 30 minutes at 177° C. at about 200 p.s.i. to fuse the resin and convert it to the polyiminobenzoxazinedione. Removal of the glass plates left a stiff sheet of infusible polyiminobenzoxazinedione reinforced with glass fabric suitable for use as a gasket material or electrical insulator.

The invention claimed is:

1. An infusible polymer consisting essentially of the formula

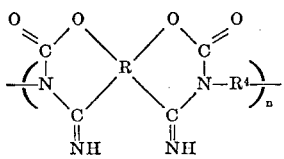

where $n$ is an integer greater than 1 to give a polymer of number average molecular weight greater than 2000
where R is a carbocyclic aromatic radical,
where $R^4$ is selected from the group consisting of an alkylene radical having 2–40 carbon atoms,

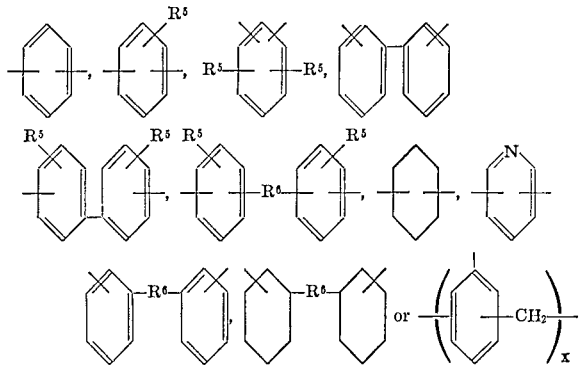

where $x$ is 1–100.
wherein $R^6$ is either an alkylene radical containing 1–4 carbon atoms,

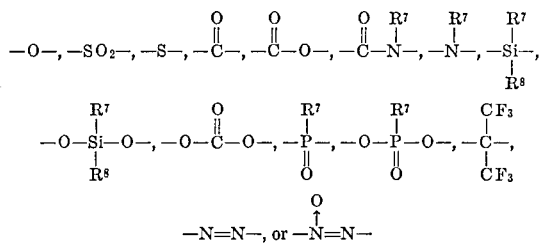

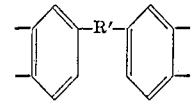

and $R^5$ is an alkyl radical of 1–3 carbon atoms and $R^7$ and $R^8$ are individually selected from the group consisting of an alkyl radical having 1–3 carbon atoms and an aryl radical.

2. The polymers of claim 1 wherein R is

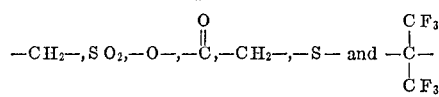

R' is selected from the group consisting of

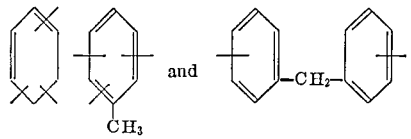

$R_5$ is selected from the group consisting of

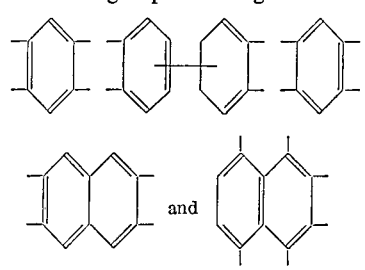

and $n$ is an integer greater than 1 and up to 100,000.

3. The polymers of claim 1 wherein
R is selected from the group consisting of

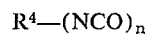

4. The process of preparing the infusible polymer of claim 1 capable of acting as an adhesive comprising reacting substantially stoichiometric amounts of at least one difunctional carbocyclic aromatic o-hydroxynitrile with at least one isocyanate of the formula $$R^4\text{—}(NCO)_n$$

where $n$ is an integer greater than 1, and where $R^4$ can be an alkylene radical having 2–40 carbon atoms,

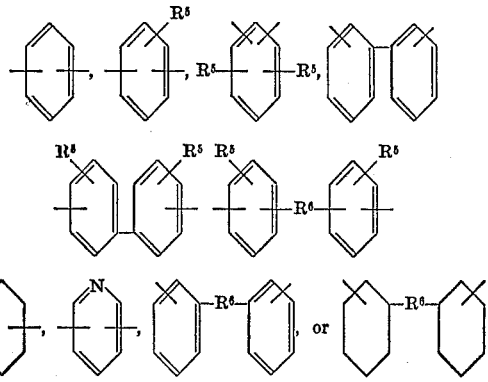

wherein $R^6$ is either an alkylene radical containing 1–4 carbon atoms,

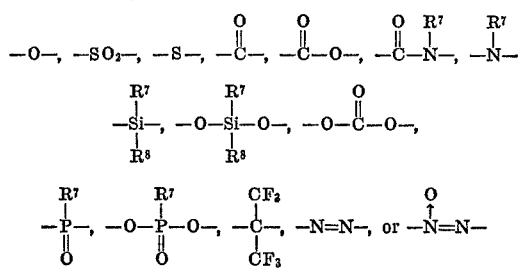

and $R^5$ is an alkyl radical of 1–3 carbon atoms and $R^7$ and $R^8$ are individually selected from the group consisting of an alkyl radical having 1–3 carbon atoms and an aryl radical, at a temperature between about 130–300° C.

5. The process of claim 4 wherein the o-hydroxynitrile is at least one member of the group consisting of 5,5'-methylene-bis-(salicylonitrile) and 2,3 - dicyanohydroquinone and the isocyanate is at least one member of the group consisting of toluene - 2,4 - diisocyanate and methylene-bis-(4-phenyl isocyanate).

References Cited
UNITED STATES PATENTS

| | | | |
|---|---|---|---|
| 3,424,728 | 1/1969 | Nakanishi et al. | 260—77.5 |
| 3,510,454 | 5/1970 | Bottenbruch et al. | 260—47 |
| 3,541,048 | 11/1970 | Binsack et al. | 260—47 |

WILLIAM H. SHORT, Primary Examiner

L. L. LEE, Assistant Examiner

U.S. Cl. X.R.

117—124 E, 138.8 A, 161 UN; 161—192; 260—30.4 N, 32.8 N, 33.2 R, 33.6 R, 33.6 UB, 33.8 R, 33.8 UB, 37 N, 63 N, 77.5 AQ, 77.5 MA, 78.4 N